United States Patent
Kishimoto

(10) Patent No.: US 12,081,718 B2
(45) Date of Patent: Sep. 3, 2024

(54) INFORMATION PROCESSING APPARATUS AND NON-TRANSITORY COMPUTER READABLE MEDIUM FOR GENERATING DESIGN ELEMENT OF DOCUMENT DATA

(71) Applicant: FUJIFILM Business Innovation Corp., Tokyo (JP)

(72) Inventor: Yasunari Kishimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 508 days.

(21) Appl. No.: 17/225,111

(22) Filed: Apr. 8, 2021

(65) Prior Publication Data

US 2022/0078309 A1    Mar. 10, 2022

(30) Foreign Application Priority Data

Sep. 8, 2020    (JP) ................................ 2020-150713

(51) Int. Cl.
| | |
|---|---|
| *H04N 1/44* | (2006.01) |
| *G06K 9/00* | (2022.01) |
| *G06V 30/412* | (2022.01) |
| *G06V 30/414* | (2022.01) |
| *H04N 1/00* | (2006.01) |

(52) U.S. Cl.
CPC ......... *H04N 1/4493* (2013.01); *G06V 30/412* (2022.01); *G06V 30/414* (2022.01); *H04N 1/00331* (2013.01); *H04N 1/4433* (2013.01)

(58) Field of Classification Search
None
See application file for complete search history.

(56) References Cited

U.S. PATENT DOCUMENTS

| | | | |
|---|---|---|---|
| 2001/0055414 A1* | 12/2001 | Thieme | G06T 11/60 |
| | | | 382/162 |
| 2012/0254730 A1* | 10/2012 | Sunderland | G06F 40/186 |
| | | | 715/234 |
| 2021/0224472 A1* | 7/2021 | Kobayashi | G06V 30/414 |

FOREIGN PATENT DOCUMENTS

JP     H10275146     10/1998

* cited by examiner

*Primary Examiner* — Andrew H Lam
(74) *Attorney, Agent, or Firm* — JCIPRNET

(57) ABSTRACT

An information processing apparatus includes a processor configured to receive document data, use a first design element forming the document data as a search key to search for a second design element in accordance with a condition of use for a design element, and perform processing on the second design element in accordance with the first design element to generate a third design element that has characteristics of the first design element.

18 Claims, 3 Drawing Sheets

INFORMATION PROCESSING APPARATUS AND NON-TRANSITORY COMPUTER READABLE MEDIUM FOR GENERATING DESIGN ELEMENT OF DOCUMENT DATA

CROSS-REFERENCE TO RELATED APPLICATIONS

This application is based on and claims priority under 35 USC 119 from Japanese Patent Application No. 2020-150713 filed Sep. 8, 2020.

BACKGROUND

(i) Technical Field

The present disclosure relates to an information processing apparatus and a non-transitory computer readable medium.

(ii) Related Art

New document data may be generated by extracting a design element from document data including the design element and using the extracted design element.

An apparatus described in Japanese Unexamined Patent Application Publication No. 10-275146 analyzes the type of a document constituent element for each document unit, extracts a design target element on the basis of the analysis result, reads a plurality of parts forming an image to be used for modifying the extracted design target element in accordance with the type of the document constituent element, and enlarges or reduces the size of the plurality of parts to be arranged at predetermined positions of the design target element, so that the design target element is modified.

SUMMARY

A condition of use may be applied to a design element forming document data, and the use of the design element may be restricted.

Aspects of non-limiting embodiments of the present disclosure relate to aiding use of a design element forming document data under a condition applied to the design element.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to receive document data, use a first design element forming the document data as a search key to search for a second design element in accordance with a condition of use for a design element, and perform processing on the second design element in accordance with the first design element to generate a third design element that has characteristics of the first design element.

BRIEF DESCRIPTION OF THE DRAWINGS

Exemplary embodiments of the present disclosure will be described in detail based on the following figures, wherein.

DETAILED DESCRIPTION

Figure 1:
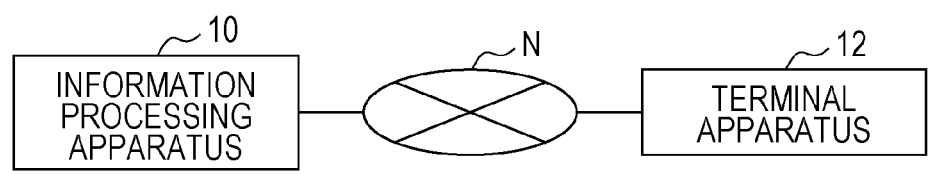
FIG. 1 is a block diagram illustrating a configuration of an information processing system according to an exemplary embodiment.

An information processing system according to an exemplary embodiment will be described with reference to FIG. 1. FIG. 1 illustrates an example of the configuration of an information processing system according to an exemplary embodiment. The information processing system according to this exemplary embodiment includes, for example, an information processing apparatus 10 and one or more terminal apparatuses 12. The information processing apparatus 10 and the one or more terminal apparatuses 12 are able to communicate with other apparatuses via a communication path N. The communication path N is, for example, the Internet, a local area network (LAN), or other networks. The information processing apparatus 10 and a terminal apparatus 12 may be configured as a single apparatus. For example, the terminal apparatus 12 may have a function of the information processing apparatus 10.

The information processing apparatus 10 is an apparatus that is configured to process document data including one or more design elements. The information processing apparatus 10 may be a server, an image processing apparatus, an image forming apparatus (for example, a printer or a multifunction machine (for example, an apparatus that includes a print function, a scan function, a copy function, and the like)), or a personal computer (hereinafter, referred to as a "PC").

Document data may be, for example, data representing a character string (that is, text data), image data, data including both a character string and an image, or the like. The document data may be data generated by creating an image from a document (for example, image data generated by scanning a document). The data format of image data is not particularly limited. The image data may be, for example, raster data (for example, bitmap (BMP) format data or joint photographic experts group (JPEG) format data) or vector data. Furthermore, the image data may be still or moving image data.

The information processing apparatus 10 may receive document data transmitted from other apparatuses (for example, a server, the one or more terminal apparatus 12, and the like) and process the received document data. Alternatively, the information processing apparatus 10 may process document data generated within the information processing apparatus 10. Furthermore, the information processing apparatus 10 may acquire from a scanner, a multifunction machine, or the like document data generated by scanning a document by the scanner, the multifunction machine, or the like.

Design elements are elements forming document data and are, for example, data representing a character string, image data, data representing a feel defining an impression given to a person by a character string or an image represented by the document data, and the like.

For example, the feel of image data is defined by the type, shape, size, hue, color tone, and the like of an object represented by the image data. The feel of text data is defined by a character string represented by the text data, the type and size of a font of the character string, and the like. Specifically, for example, an impression such as "beautiful", "cool", "casual", or "natural" corresponds to an example of a feel. An impression given to a person by the whole document data may be defined as a feel, and a feel may be defined for each design element. For example, a plurality of design elements form document data, and an impression of the document data is formed based on an impression of each of the design elements.

The terminal apparatuses 12 are, for example, PCs, tablet PCs, smartphones, or mobile phones. For example, a service for processing document data may be provided by the information processing apparatus 10, and a user may operate a terminal apparatus 12 to access the information processing apparatus 10 and use the service.

Figure 2:
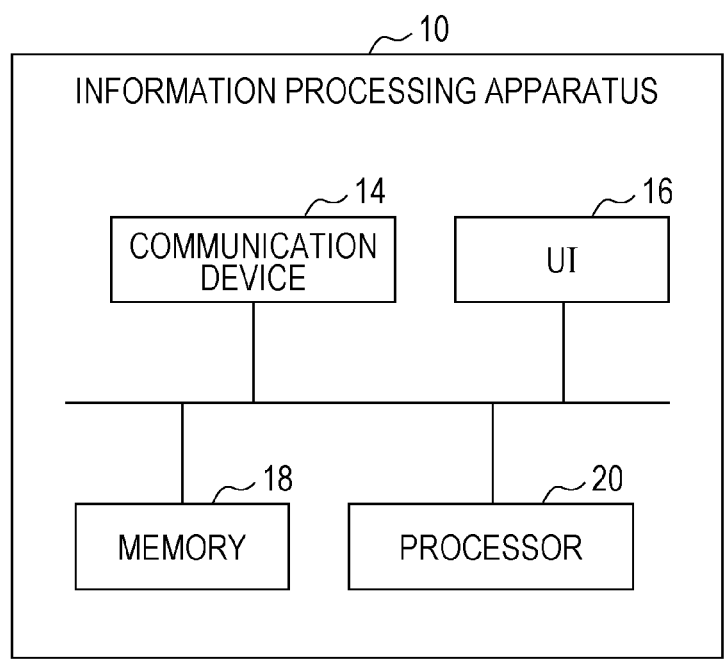
FIG. 2 is a block diagram illustrating a configuration of an information processing apparatus.

Hereinafter, a configuration of the information processing apparatus 10 will be described with reference to FIG. 2. FIG. 2 illustrates an example of the configuration of the information processing apparatus 10.

The information processing apparatus 10 includes, for example, a communication device 14, a user interface (UI) 16, a memory 18, and a processor 20.

The communication device 14 is a communication interface that includes a communication chip, a communication circuit, and the like and has a function for transmitting information to other apparatuses and a function for receiving information transmitted from other apparatuses. The communication device 14 may perform wired communication or wireless communication.

The UI 16 is a user interface and includes a display and an operation device. The display is a liquid crystal display, an electroluminescent (EL) display, or the like. The operation device includes a keyboard, an input key, an operation panel, and the like. The UI 16 may be, for example, a touch panel that include the display and the operation device.

The memory 18 is a device that includes one or more memory regions in which various types of information are stored. The memory 18 is, for example, a hard disk drive, various memories (for example, a random access memory (RAM), a dynamic random access memory (DRAM), a read only memory (ROM), and the like), other types of memory devices (for example, an optical disc or the like), or a combination of the hard disk drive, the memories, and the other memory devices. One or more memories 18 are provided in the information processing apparatus 10.

The processor 20 is configured to control operation of the units of the processor 20. The processor 20 may include a memory.

In this exemplary embodiment, the processor 20 receives document data to be processed. The processor 20 uses a design element forming the document data as a search key to search for another design element in accordance with a condition of use for a design element. Hereinafter, a design element used as a search key will be referred to as a "first design element", and a design element found by the search using the search key will be referred to as a "second design element".

Conditions of use include at least one of, for example, conditions on use license of a design element (for example, conditions on intellectual property license such as copyright), conditions on restrictions for usage of a design element, conditions for whether or not to permit commercial use of a design element (that is, permission or prohibition of commercial use), conditions for the case where commercial use is permitted, conditions for the case where commercial use is prohibited, conditions for whether or not to permit private use (that is, use different from commercial use) of a design element (that is, permission or prohibition of private use), conditions for the case where private use is permitted, conditions for the case where private use is prohibited, conditions for whether or not to permit modification of a design element (that is, permission or prohibition of modification), conditions for the case where modification is permitted, and conditions for the case where modification is prohibited.

A condition of use applied when searching for a design element is performed may be specified by a user or defined in advance. For example, a condition of use is specified by a user, and the processor 20 searches for a second design element in accordance with the condition of use specified by the user.

For example, information indicating a condition of use is linked to image data and text data to be searched for. The processor 20 searches for, as a second design element, image data or text data linked to a condition of use that matches a condition of use specified by a user or a predetermined condition of use. For example, in the case where a condition of use specified by a user is that commercial use is permitted, the processor 20 searches for, as a second design element, image data or text data permitted for commercial use. In the case where a condition of use specified by a user is that modification of a design element is permitted, the processor 20 searches for, as a second design element, image data or text data permitted for modification. In the case where a condition of use specified by a user is that copyright for a design element is abandoned or free use of a design element is permitted although copyright for the design element is not abandoned, the processor 20 searches for a second design element whose copyright is abandoned or a second design element permitted to be used freely although copyright of the second design element is not abandoned. The same applies to the other conditions of use.

For example, the processor 20 may search a database of image data or text data for a second design element or may search the Internet for image data or text data as a second design element.

The processor 20 may search a database, the license of which is granted to a user, for a second design element. The user who is granted the license is permitted to use a design element registered to the database. For example, commercial use, modification, or the like of a design element is permitted. For example, information for identifying a user who is granted the license (for example, account information or the like) is linked to the database. When the user logs into the information processing apparatus 10 using the account information, the processor 20 searches the database linked to the account information of the user who has logged in for a second design element.

In the case where a first design element is image data, the processor 20 searches for, as a second design element(s), one or more pieces of image data similar to the image data as the first design element. For example, a known technique for searching for a similar image is used.

In the case where the first design element is text data, the processor 20 searches for one or more pieces of text data similar to the text data as the first design element (for example, one or more pieces of text data representing a character string that has the same meaning as or similar meaning to a character string represented by the text data as the first design element).

The processor 20 may search for a second design element that has the same feel as or similar feel to a feel of the first design element. In this case, the first design element and the second design element may be image data or text data. For example, in the case where the first design element is text data, the second design element that is searched for on the basis of the first design element may be image data. On the other hand, in the case where the first design element is image data, the second design element that is searched for on the basis of the first design element may be text data. Obviously, image data as a second design element may be searched for on the basis of the feel of image data as a first design element, or text data as a second design element may be searched for on the basis of the feel of text data as a first design element.

In the case where document data to be processed includes a plurality of first design elements, the processor 20 may perform AND search or OR search.

The processor 20 may use a plurality of first design elements as search keys to search for a second design element for each of the first design elements or to search for a design element similar to all the plurality of first design elements.

The processor 20 may use, as a search key(s), one or more first design elements selected from among a plurality of first design elements by a user to search for a second design element. For example, the processor 20 displays a plurality of first design elements on the display of the terminal apparatus 12 of the user, and the user selects a search key from among the displayed plurality of first design elements.

Furthermore, the processor 20 performs processing on a second design element on the basis of a first design element to generate a design element that has characteristics of the first design element. Hereinafter, a design element generated as described above will be referred to as a "third design element".

Processing performed on a second design element includes at least one of, for example, trimming processing, mask processing, enlargement processing, and processing for making a subject represented by the second design element close to a subject represented by the first design element (hereinafter, referred to as "processing regarding a subject"). The processor 20 may perform predetermined processing on the second design element or perform processing selected by the user on the second design element.

For example, the processor 20 performs trimming processing or enlargement processing on the second design element such that the size of the second design element (for example, the size of a range occupied by image data or text data) is the same size as the size of the first design element.

The mask processing is processing for setting a region for displaying or hiding the entire raster data or part of vector data.

The processing regarding a subject is, for example, processing for making an impression of the second design element close to an impression of the first design element. For example, in the case where the first design element and the second design element are image data, processing for making an impression of the image data as the second design element close to an impression of the image data as the first design element is an example of the processing regarding a subject. The same applies to a case where the first design element and the second design element are text data or a case where one of the first design element and the second design element is text data and the other one of the first design element and the second design element is image data.

For example, the processor 20 may make an impression of image data as the second design element close to an impression of image data as the first design element by making the color tone and hue of the image data as the second design element close to the color tone and hue of the image data as the first design element (for example, by making the color tone and hue of the second design element the same as the color tone and hue of the first design element or changing the color tone and hue of the second design element into color tone and hue similar to the color tone and hue of the first design element).

Furthermore, the processor 20 may make an impression of text data as the second design element close to an impression of text data as the first design element by making the type of font of a character string or the size of characters represented in the text data as the second design element close to the type of font of a character string or the size of characters represented in the text data as the first design element (for example, by making the type of font or the size of characters of the second design element the same as the type of font or the size of characters of the first design element or changing the type of font or the size of characters of the second design element into a type of font or a size of characters similar to the type of font or the size of characters of the first design element).

The processor 20 may generate new document data including a third design element. For example, the processor 20 may generate new document data by replacing a first design element with a third design element in the original document data including the first design element.

The processor 20 may output the generated third design element. For example, the processor 20 may transmit the third design element to a terminal apparatus 12 or other apparatuses or may cause a memory of the information processing apparatus 10 or other apparatuses to store the third design element.

The terminal apparatus 12 includes, for example, a communication device, a UI, a memory, and a processor. Part of or the entire process performed by the processor 20 of the information processing apparatus 10 may be performed by the processor of the terminal apparatus 12.

Hereinafter, a specific example of an exemplary embodiment will be described in detail.

Figure 3:
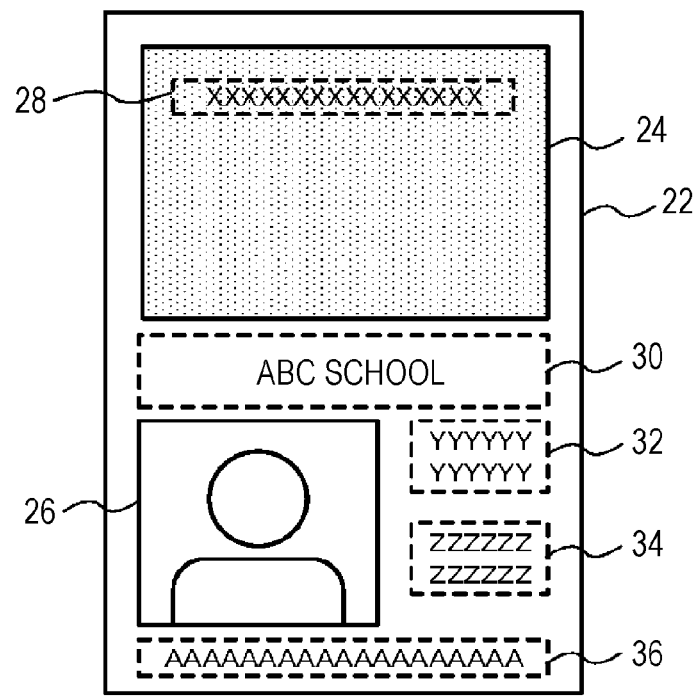
FIG. 3 is a diagram illustrating document data.

FIG. 3 illustrates an example of document data. Document data 22 is, for example, data representing a pamphlet, a flyer, a poster, a direct mail, or the like or data representing content such as a photograph, an illustration, or the like. The document data 22 may be other kinds of data.

The document data 22 includes, for example, images 24 and 26 and text 28, 30, 32, 34, and 36. The images 24 and 26 and the text 28, 30, 32, 34, and 36 are examples of a first design element.

The processor 20 receives the document data 22 to be processed. For example, a user uses a terminal apparatus 12 to specify the document data 22 to be processed, and the processor 20 receives the document data 22 specified by the use. As another example, a scanner or the like may read a document to generate the document data 22, and the processor 20 may receive the generated document data 22. The processor 20 may receive the document data 22 that has been input to the information processing apparatus 10 by other methods.

The processor 20 analyzes the document data 22 to extract a first design element from the document data 22. For example, the processor 20 analyzes the document data 22 to identify an image region in which an image is arranged and a character region in which text is arranged in the document data 22, and extracts the images 26 and 26 and the text 28, 30, 32, 34, and 36, which are first design elements.

The processor 20 may apply character recognition processing to the text 28, 30, 32, 34, and 36 to extract characters from the text. For example, the processor 20 applies optical character recognition (OCR) to text to extract characters from the text.

Next, the processor 20 uses a first design element as a search key to search for a second design element in accordance with a condition of use for a design element.

For example, conditions of use are that commercial use is permitted and modification is permitted. In this case, the processor 20 searches for a second design element that is permitted for commercial use and modification. For example, the conditions of use are specified by a user. The conditions of use are merely an example, and other conditions of use may be applied.

For example, the processor 20 searches for image data as an example of a second design element. For example, the processor 20 may search a database of image data for image data, search the Internet for image data, search a database licensed to a user for image data.

For example, the processor 20 uses the image 26, which is an example of a first design element, as a search key to search for image data that is similar to the image 26 and permitted for commercial use and modification as a second design element. The user may specify the image 26 to be used as a search key or the processor 20 may use the image 26 as a search key without specification by the user.

Figure 4:
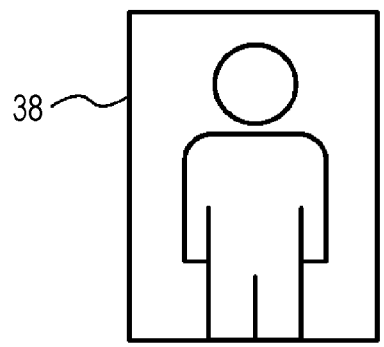
FIG. 4 is a diagram illustrating an image found by search.

FIG. 4 illustrates a result of the search. An image 38 illustrated in FIG. 4 is an example of a second design element and is an image found by search using the image 26 as a search key. For example, the image 38 is an image similar to the image 26 as the first design element and permitted for commercial use and modification. In FIG. 4, an image 38 is illustrated as an example of a result of search. However, a plurality of images may be found by search.

The processor 20 performs processing on the image 38 as the second design element on the basis of the image 26 as the first design element to generate, as a third design element, another image data that has characteristics of the image 26. For example, in the case where the image 38 as the second design element is an image that is permitted for modification, the processor 20 performs processing on the image 38.

For example, the processor 20 performs trimming processing or enlargement processing on the image 38 such that the size of the image 38 as the second design element is the same as the size of the image 26 as the first design element. In the case where the image 38 is larger than the image 26, the processor 20 performs trimming processing on the image 38. In the case where the image 38 is smaller than the image 26, the processor 20 performs enlargement processing on the image 38. The user may issue an instruction for execution of trimming processing or enlargement processing, and the processor 20 may perform the trimming processing or the enlargement processing on the image 38 in accordance with the instruction from the user.

Figure 5:
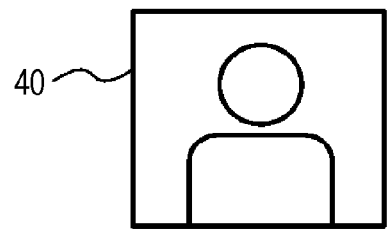
FIG. 5 is a diagram illustrating an image on which trimming processing has been performed.

For example, the processor 20 performs trimming processing on the image 38 as the second design element, so that the size of the image 38 is adjusted to the same size as the image 26 as the first design element. FIG. 5 illustrates an image 40 on which trimming processing has been performed. The image 40 is an image generated by performing trimming processing on the image 38 and is an example of a third design element. The size of the image 40 is the same size as the image 26 as the first design element.

The processor 20 may perform mask processing on the image 38 in addition to or without performing trimming processing on the image 38. Accordingly, the image 38 may be represented by vector data. In the case where a user issues an instruction for execution of mask processing, the processor 20 may perform the mask processing on the image 38.

Furthermore, the processor 20 may perform processing regarding a subject on the image 38 such that the subject of the image 38 as the second design element is close to the subject of the image 26 as the first design element. For example, the processor 20 makes the subject of the image 38 close to the subject of the image 26 by making the color tone and hue of the image 38 the same as the color tone and hue of the image 26 or changing the color tone and hue of the image 38 into a color tone and hue similar to the color tone and hue of the image 26. Accordingly, a new image that has an impression close to the impression of the image 26 is generated.

The processor 20 may display the image 26 as the third design element on the display of the terminal apparatus 12 or may cause the information processing apparatus 10, the terminal apparatus 12, or other apparatuses to store data of the image 26.

Figure 6:
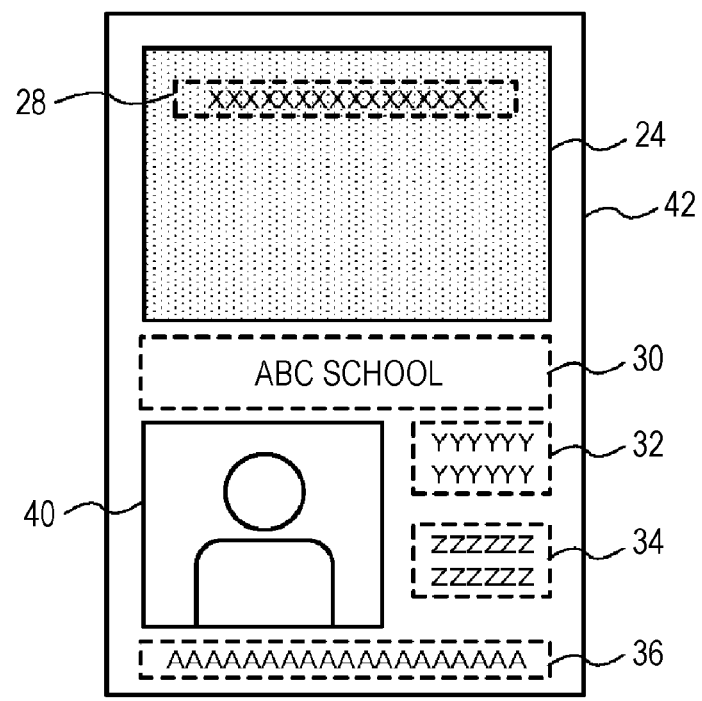
FIG. 6 is a diagram illustrating document data.

Furthermore, the processor 20 may generate new document data using the image 40 as the third design element. For example, as illustrated in FIG. 6, the processor 20 generates new document data 42 by replacing the image 26 as the first design element with the image 40 as the third design element in the document data 22 illustrated in FIG. 3. The processor 20 may create a catch phrase or a summary of description based on the image 40 and add the created catch phrase or summary of description to the document data 42.

The processor 20 may display information regarding use of a second design element on a display. For example, information regarding use of a second design element is displayed on the display of the terminal apparatus 12. Information regarding use of a second design element is, for example, information indicating a condition of use for the second design element. In the example illustrated in FIG. 4, the processor 20 displays the image 38 as the second design element and information indicating a condition of use for the image 38 as reference information on the display. For example, information regarding copyright of the image 38, information indicating restriction of use of the image 38, information indicating whether or not to permit commercial use of the image 38, information indicating whether or not to permit private use of the image 38, information indicating whether or not to permit modification of the image 38, or the like is displayed as reference information on the display. The reference information mentioned above may be displayed before the image 38 is used. For example, reference information of the image 38 may be displayed before processing (for example, trimming processing) is performed on the image 38 or new document data is generated using the image 38 or a processed image (for example, the image 40). The user may determine, by referring to the reference information, whether or not to permit use of the image 38. The processor 20 may superimpose information regarding a condition of use for the image 38 as a watermark on the image 38.

The processor 20 may calculate the similarity between document data to be processed (for example, the document data 22 illustrated in FIG. 3) and new document data generated based on the document data (for example, the document data 42 illustrated in FIG. 6) and display information indicating the similarity on the display of the terminal apparatus 12.

The processor 20 may use a character string obtained from document data to be processed (for example, the document data 22 illustrated in FIG. 3) as a search key to search for a second design element (for example, image data or text data) in accordance with a condition of use for a design element.

For example, the processor 20 uses text included in the document data 22 (for example, the text 28 or the like), a term included in the text, or a summary of the text as a search key to search for a second design element in accordance with a condition of use for a design element. For example, the processor 20 searches for, as a second design element, image data or text data linked to the same content as or similar content to text, a term, or a summary as a search key. The processor 20 may use text, a term, or a summary as a search key to search for a second design element, in place of or in addition to image search.

The processor 20 may use the relationship between a plurality of first design elements as a search key to search for a second design element (for example, image data or text data) in accordance with a condition of use for a design element.

The relationship between a plurality of first design elements is at least one of, for example, the contrast relationship between the plurality of first design elements, the size relationship between the plurality of first design elements, and the arrangement relationship between the plurality of first design elements.

The relationship between a plurality of first design elements used as a search key may be specified by a user or defined in advance.

For example, the processor 20 may search for a plurality of second design elements that have the same contrast relationship as the contrast relationship between a plurality of first design elements or may search for a plurality of second design elements that have a contrast relationship close to the contrast relationship between a plurality of first design elements (for example, a plurality of second design elements that have a contrast relationship whose difference from the contrast relationship between a plurality of first design elements is less than or equal to a threshold).

The processor 20 may search for a plurality of second design elements that have the same size relationship as the size relationship between a plurality of first design elements or may search for a plurality of second design elements that have a size relationship close to the size relationship between a plurality of first design elements (for example, a plurality of second design elements that have a size relationship whose difference from the size relationship between a plurality of first design elements is less than or equal to a threshold).

The processor 20 may search for a plurality of second design elements that have the same arrangement relationship as the arrangement relationship between a plurality of first design elements or may search for a plurality of second design elements that have an arrangement relationship close to the arrangement relationship between a plurality of first design elements (for example, a plurality of second design elements that have an arrangement relationship whose difference from the arrangement relationship between a plurality of first design elements is less than or equal to a threshold).

Figure 7:
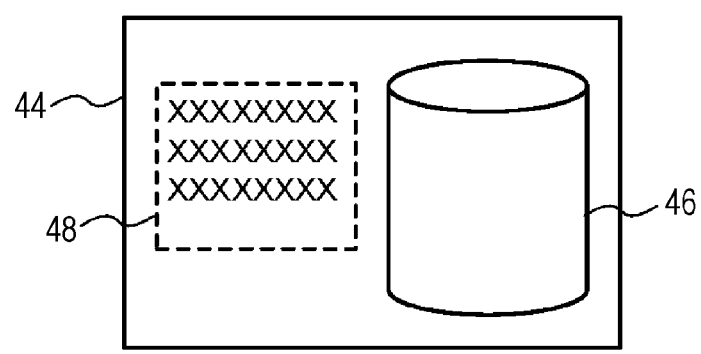
FIG. 7 is a diagram illustrating an image and text.

An example of processing performed in the case where the relationship between a plurality of first design elements is used as a search key will be described with reference to FIG. 7. FIG. 7 illustrates an image and text as examples of a first design element. For example, arrangement relationship will be described.

An image 44 is a first design element, and the image 44 includes an object 46. In the image 44, text 48, which is another first design element, is arranged in a region provided next to the object 46. That is, the text 48 is arranged in a free space of the image 44. This arrangement relationship is the arrangement relationship between the image 44 and the text 48. That is, the arrangement relationship between the image 44 and the text 48 is a relationship in which the text 48 is arranged in a region next to the object 46 in the image 44. In other words, the image 44 is a first design element that includes a region next to the object 46 displayed in the image 44 and another first design element (for example, text or another image) is arranged in the region.

In the case where the image 44 and the text 48 are used as a search key, the processor 20 may search for a plurality of second design elements that have the same arrangement relationship as the arrangement relationship between the image 44 and the image 44 or may search for a plurality of second design elements that have an arrangement relationship close to the arrangement relationship between the image 44 and the text 48. That is, the processor 20 searches for a second design element (for example, an image or text) that includes a region in which another second design element (for example, an image or text) is arranged and for the other second design element arranged in the second design element.

The processor 20 may search for a second design element, such as the image 44, that includes a region in which another design element (for example, text or another image) is arranged. In this case, the processor 20 may not use the text 48 as a search key.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. An information processing apparatus comprising:
 a processor configured to
  receive document data, use a first design element forming the document data as a search key to search for a second design element in accordance with a condition of use for a design element, and perform processing on the second design element in accordance with the first design element to generate a third design element that has characteristics of the first design element.

2. The information processing apparatus according to claim 1, wherein the processor is further configured to use a character string obtained from the document data as a search key to search for the second design element in accordance with the condition of use.

3. The information processing apparatus according to claim 1,
wherein the document data includes a plurality of first design elements, and
wherein the processor is further configured to use a relationship between the plurality of first design elements as a search key to search for the second design element in accordance with the condition of use.

4. The information processing apparatus according to claim 2,
wherein the document data includes a plurality of first design elements, and
wherein the processor is further configured to use a relationship between the plurality of first design elements as a search key to search for the second design element in accordance with the condition of use.

5. The information processing apparatus according to claim 1, wherein the processing includes at least one of trimming processing and mask processing on an image.

6. The information processing apparatus according to claim 2, wherein the processing includes at least one of trimming processing and mask processing on an image.

7. The information processing apparatus according to claim 3, wherein the processing includes at least one of trimming processing and mask processing on an image.

8. The information processing apparatus according to claim 4, wherein the processing includes at least one of trimming processing and mask processing on an image.

9. The information processing apparatus according to claim 1, wherein the processor is further configured to display information regarding use of the second design element on a display.

10. The information processing apparatus according to claim 2, wherein the processor is further configured to display information regarding use of the second design element on a display.

11. The information processing apparatus according to claim 3, wherein the processor is further configured to display information regarding use of the second design element on a display.

12. The information processing apparatus according to claim 4, wherein the processor is further configured to display information regarding use of the second design element on a display.

13. The information processing apparatus according to claim 5, wherein the processor is further configured to display information regarding use of the second design element on a display.

14. The information processing apparatus according to claim 6, wherein the processor is further configured to display information regarding use of the second design element on a display.

15. The information processing apparatus according to claim 7, wherein the processor is further configured to display information regarding use of the second design element on a display.

16. The information processing apparatus according to claim 8, wherein the processor is further configured to display information regarding use of the second design element on a display.

17. A non-transitory computer readable medium storing a program causing a computer to execute a process for information processing, the process comprising:
receiving document data;
using a first design element forming the document data as a search key to search for a second design element in accordance with a condition of use for a design element; and
performing processing on the second design element in accordance with the first design element to generate a third design element that has characteristics of the first design element.

18. An information processing apparatus comprising:
means for receiving document data;
means for using a first design element forming the document data as a search key to search for a second design element in accordance with a condition of use for a design element; and
means for performing processing on the second design element in accordance with the first design element to generate a third design element that has characteristics of the first design element.

* * * * *